(12) United States Patent
Carlson

(10) Patent No.: US 7,935,749 B2
(45) Date of Patent: May 3, 2011

(54) PRODUCTION OF WARM-MIX ASPHALT COMPOSITIONS UTILIZING A POLYHYDRIC ALCOHOL

(76) Inventor: David A. Carlson, Kent, OH (US)

( * ) Notice: Subject to any disclaimer, the term of this patent is extended or adjusted under 35 U.S.C. 154(b) by 375 days.

(21) Appl. No.: 12/148,244

(22) Filed: Apr. 17, 2008

(65) Prior Publication Data

US 2009/0264561 A1   Oct. 22, 2009

(51) Int. Cl.
*C08L 95/00* (2006.01)
(52) U.S. Cl. ............... 524/68; 106/276; 106/277
(58) Field of Classification Search .......... 524/68; 106/276, 277
See application file for complete search history.

(56) References Cited

U.S. PATENT DOCUMENTS

| | | | |
|---|---|---|---|
| 3,285,871 A * | 11/1966 | Carlson | ............... 524/71 |
| 5,414,029 A | 5/1995 | Lemoine | |
| 5,928,418 A | 7/1999 | Tamaki et al. | |
| 6,093,494 A | 7/2000 | Schulz et al. | |
| 6,403,687 B1 | 6/2002 | Schulz et al. | |
| 6,451,885 B1 | 9/2002 | Dresin et al. | |
| 2007/0191514 A1 | 8/2007 | Reinke et al. | |

FOREIGN PATENT DOCUMENTS

| | | |
|---|---|---|
| JP | 60-141740 | 7/1985 |
| JP | 03250053 A | 11/1991 |
| JP | 06057147 A | 3/1994 |
| JP | 08133798 A | 5/1996 |
| JP | 2000198934 A | 7/2000 |

* cited by examiner

*Primary Examiner* — Robert D. Harlan
(74) *Attorney, Agent, or Firm* — Hudak, Shunk & Farine Co. LPA

(57) ABSTRACT

Rubber particles in a water and polyhydric alcohol solution are added to an asphalt whereby the polyhydric alcohol substantially coats the rubber particles resulting in an easily mixed composition with the mixing temperature being reduced to a range of from about 250° F. to about 310° F. resulting in considerable energy savings. In a similar manner, a filler can be substantially coated by polyvinyl alcohol-water solution and the same blended with an asphalt and mixed at reduced temperatures. Another embodiment relates to the utilization of a polyhydric alcohol that is added to an asphalt and mixed therewith at reduced temperatures.

11 Claims, 1 Drawing Sheet

PRODUCTION OF WARM-MIX ASPHALT COMPOSITIONS UTILIZING A POLYHYDRIC ALCOHOL

FIELD OF THE INVENTION

The present invention relates to the production of warm-mixed asphalt utilizing rubber latex dispersions containing a polyhydric alcohol that coats the rubber particles, with the latex acting as an aid to lower the mixing and compaction temperature of an asphalt-rubber composition.

BACKGROUND OF THE INVENTION

Blends of rubbers and asphalt have been used in paving for years. One of the accepted methods of adding polymers to asphalt is by means of injecting latex, an aqueous dispersion of microscopic particles of polymer in water, into hot, liquid asphalt during the production of hot-mixed asphalt paving mixtures at a contractor's hot-mix asphalt plant. Although it has been known that there are advantages in using the rubber in the form of latex, there have been various drawbacks, perhaps the chief of which has been the fact that latex modified asphalt can have a significantly higher viscosity than conventional asphalt used for hot-mixed asphalt applications. The increased viscosity can be due to the swelling, that is, the partial solvating, of the polymer particles in the asphalt and the tangled network of polymer chains produced in the asphalt matrix. This phenomenon can require latex modified asphalt paving mixtures to be mixed and applied at higher temperatures than conventional hot-mixed asphalt pavements.

There is a need in the asphalt paving industry to lower hot-mixed asphalt paving mixing and application temperatures. This effort has resulted in a form of hot-mixed asphalt termed "warm mix". Warm mix technology attempts to produce a similar product as conventional hot-mixed asphalt but which is mixed and installed approximately 60° F. lower than conventional hot-mixed asphalt pavements.

Several products and techniques have been promoted to achieve warm mix. They include injecting water directly into the asphalt, incorporating the use of zeolite that holds water and releases it slowly into the asphalt in the form of tiny droplets, adding a wax produced from the gasification of coal and the use of asphalt emulsions. These techniques and products are perceived to have limitations. The mechanism by which most of the warm mix products believably work is not to reduce the viscosity of the asphalt, but to form "slip planes" in the asphalt in the form of microscopic globules of substances which are non-solvent liquids at mixing temperatures for the asphalt. Globules are defined as liquid or liquid-like particles and non-solvent is defined as having no or very little ability to dissolve a substance in another substance. These non-solvent globules include water and waxes and other substances. The non-solvent microscopic globules believably allow sheer forces applied to the asphalt to deform the asphalt making it more "fluid" and easier to mix with aggregate at a lower temperature. This same phenomenon allows the paving mixture produced with these materials to be applied and compacted at lower temperatures as well. The volume of microscopic non-solvent globules required to produce warm mix varies but generally is in the range of 1% to 3% of the asphalt content.

U.S. Pat. No. 3,285,871 to Carlson relates to a disclosure wherein the water of the latex is replaced by a polyhydric alcohol, and this dispersion or latex is mixed with the bitumen. The dispersion or latex may be formed by evaporating the water of the latex under a vacuum and replacing it with the alcohol, or when the rubber is a synthetic polymer, such as dispersion of the polymer in the alcohol may be produced directly by carrying the polymerization out in the alcohol instead of in water. For certain latexes, it is necessary to increase the quantity of stabilizer over that required for an aqueous latex, in order to prevent coagulation during processing.

SUMMARY OF THE INVENTION

The present invention relates to the utilization of one or more polyhydric alcohols and water in conjunction with asphalt per se (i.e. containing substantially no aggregate) to form an asphalt-rubber composition wherein the polyhydric alcohol-water phase generally coats the rubber particles and retards the same from swelling as by being solvated by the asphalt. Thus the utilization of and retention of water in the initial blend of the asphalt, rubber, and polyhydric alcohol is an important aspect of the present invention because the boiling point of the alcohol-water phase is raised to that of the warm-mix asphalt mixing temperature that allows the alcohol-water phase to maintain an effective coating on the rubber particles with a small amount of the polyhydric alcohol. The application of any vacuum to remove water is avoided and is not within the scope of the present invention. Subsequently, or concurrently, aggregate can be added to the asphalt-rubber composition to produce a paving mixture suitable for the construction of asphalt pavements. It is desirable to add the latex rubber compound containing the polyhydric alcohol to a mixing chamber or drum located at a contractor's hot-mix plant as the alcohol-water coating on the latex particle best serves to retard the swelling of the rubber latex particles in the asphalt at temperatures that the asphalt is utilized for mixing with aggregates.

In one aspect of the present invention, a rubberized asphalt composition comprises from about 2 to about 18 parts by weight of one or more polyhydric alcohols per 100 parts by weight of one or more rubbers wherein said one or more polyhydric alcohols substantially coat said rubber particles, said one or more rubbers having a Mooney value ML/4/212° F. of from about 50 to about 300; and from about 1 to about 15 parts by weight of said one or more rubber particles per 100 parts by weight of one or more asphalts.

DETAILED DESCRIPTION OF THE INVENTION

Figure 1:
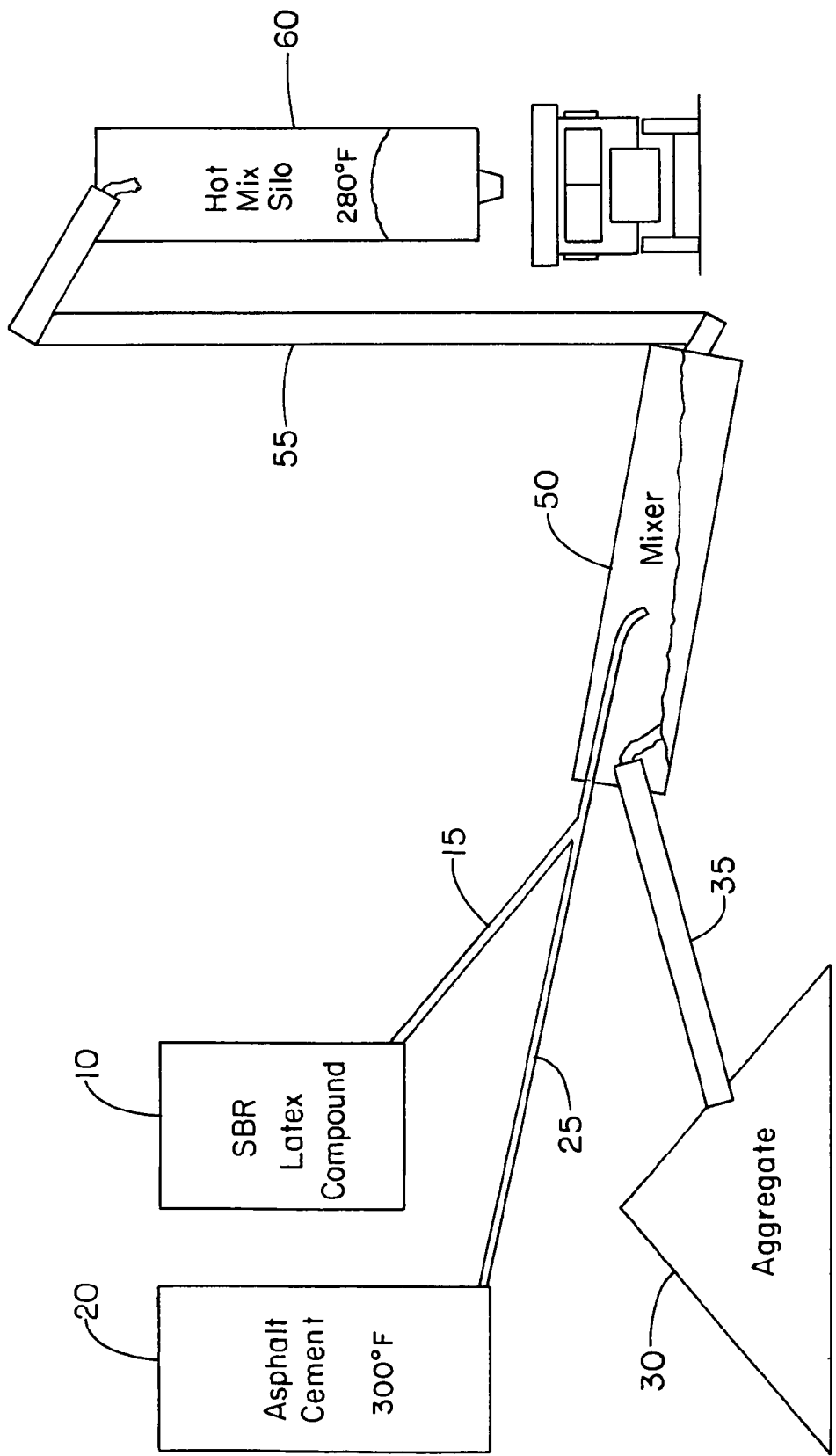
FIG. 1 is a schematic of a process of the present invention wherein a rubber latex containing polyhydric alcohol is blended with a hot asphalt cement and mixed, optionally with aggregate, to produce lower mixing temperatures than the mixing temperatures of a conventional stabilized asphalt-rubber composition.

The one or more rubber particles of the present invention are generally polymers or copolymers derived from one or more conjugated dienes having from 4 to about 8 carbon atoms or a halogenated diene such as a chloro or fluoro conjugated diene. Copolymers can contain repeat units derived from various vinyl substituted aromatics having a total of from 8 to about 12 carbon atoms. Examples of suitable conjugated diene monomers include chloroprene, isoprene, butadiene, 2,3-dichlorobutadiene, 2-chlorobutadiene, 2,3-dichlorobutadiene, 2-fluorobutadiene, and the like. Examples of suitable substituted vinyl aromatic compounds include styrene, α-methyl styrene, vinyl toluene, vinyl naphathalene, a substituted styrene such as a halo-styrene, an alkyl styrene wherein the alkyl group has from 1 to 5 carbon atoms, and the like. Optional non-conjugated comonomer include isobutylene, acrylonitrile, or piperylene, and the like. Rubber made from natural rubber can also be utilized. Examples of specific rubber copolymers include isobutylene-isoprene, butadiene-acrylonitrile, and the like. A preferred rubber is a copolymer of butadiene and styrene.

The rubber particles of the present invention generally have a particle size of from about 100 to about 5,000 angstroms, desirably from about 500 to about 3,000 angstroms, and preferably from about 600 to about 2,500 angstroms. The Mooney viscosity of such rubber particles, that is (ML/4/212° F.), is about 50 or higher, desirably from about 60 to about 300, and preferably from about 80 to about 160. The amount of the one or more rubber particles utilized is generally from about 1 to about 15 parts by weight, desirably from about 1 to about 10 parts by weight, and preferably from about 2 to about 5 parts by weight per 100 parts by weight of the asphalt per se (i.e. without aggregate).

The rubber particles are generally made in the form of a latex that, of course, contains water therein. The amount of the water is generally from about 25 to about 400, desirably from about 35 to about 200, and preferably from about 45 to about 100 parts by weight per 100 parts by weight of the rubber content of the latex compound per se.

The one or more asphalts utilized herein can be generally described as a dark brown to black cementatious material, solid or semi-solid in consistency at ambient temperature, in which the predominating constituents are bitumens that occur in nature or are obtained as residue in petroleum refining plants. Such asphalts include native and artificial bitumens, tars, coal tars, gas house tars, coke oven tars, water gas tars, pitches, road oils, pyrogenous based bitumens, cut-black bitumens, and the like. Asphalts are generally defined by penetration values at 77° F. according to ASTM D-5 of at least about 30, desirably from about 40 to about 300, and preferably from about 50 to about 150 one-tenth millimeters. Another classification tool is the Sharp grading system wherein the asphalt is identified as asphalt cement commonly used for asphalt paving applications desirably having a high temperature grading of 46 degrees Celsius or higher and a low temperature grading of minus 16 degrees Celsius or lower and preferably having a high temperature grading of 58 degrees Celsius or higher and a low temperature grading of minus 22 degrees Celsius or lower.

An important aspect of the present invention is the utilization of one or more polyhydric alcohols in association with water inasmuch as the same has been found to unexpectedly lower the mixing temperature of the rubber particles with the hot asphalt. The polyhydric alcohol should have a boiling point that is higher than water and desirably will not boil at the mixing temperature of the rubber with the asphalt, that is, at a temperature of from about 250° F. to about 310° F. Preferably the boiling points of the polyhydric alcohols are in excess of 320° F. Examples of such polyhydric alcohols include glycerol (glycerine), crude glycerol, glycols having from 2 to about 4 carbon atoms such as ethylene glycol, propylene glycol, and the like, as well as polyglycols having from 2 to about 12 carbon atoms in the repeat unit and desirably a number average molecular weight of about 100 to about 20,000, and preferably from about 100 to about 8,000. Examples of specific polyglycols include diethylene glycol, triethylene glycol, polyethylene glycol 8000, dipropylene glycol, and tripropylene glycol and the like.

Another type of alcohol that can be utilized in the present invention are various sugars chemically known as sucrose, glucose, or fructose that can be substituted either partially or fully with respect to the polyhydric alcohol. Such sugars can be derived from suitable sources including cane, beet, corn, or other organic plants.

The purpose of the one or more polyhydric alcohols is to coat the rubber particles of the rubber latex so that upon mixing the rubber latex with the asphalt, the rubber particles are blended or dispersed throughout the asphalt and do not agglomerate or stick to one another. Thus, the utilization of water that inherently has a high solubility parameter with the polyhydric alcohol and the rubber latex is important since the alcohol helps elevate the boiling point of the water and the solubility parameter of the water in turn aids in dispersion of the polyhydric alcohol to form a thin coated layer substantially or completely (i.e. 100%) around the rubber particles of the rubber latex thereby preventing them from agglomerating or sticking to one another and also reducing the amount of polyhydric alcohol required in the rubber latex. Based upon the total surface area of all rubber particles, generally at least about 80% is coated, desirably at least about 90% is coated, and preferably at least about 95% or at least about 98% is coated by the polyhydric alcohol. Inasmuch as polyhydric alcohols tend to be somewhat expensive and also soften the asphalt, a very undesirable property, low amounts of the polyhydric alcohol are utilized. Low amounts of the polyhydric alcohol utilized are from about 2 to about 18 parts by weight, desirably from about 3 to about 12 parts by weight, and preferably from about 4 to about 8 parts by weight per 100 parts by weight of the rubber particles.

The blending process of the rubber latex containing one or more polyhydric alcohols therein and the one or more hot asphalts, generally having a temperature of from about 290° F. to about 320° F., can generally be carried out by any conventional manner. For example, a desired amount of the polyhydric alcohol is added to the rubber latex composition to form a solution, containing from about 35 to about 200 parts of water by weight per 100 parts by weight of the rubber particles and from about 3 to about 12 parts by weight of the one or more polyhydric alcohols based upon 100 total parts by weight of the rubber particles. Subsequently, the rubber latex containing the polyhydric alcohol can be added and mixed with one or more asphalts in the amount of about 1 to 10 parts by weight rubber per 100 parts by weight asphalt in any conventional manner such as by addition to an agitated tank or the pug mill or drum mixer of a typical hot-mix asphalt plant. A desired mixer includes a rotating heated drum. Mixing temperatures for commercially available polymer modified asphalts with aggregates is typically from about 320° F. to about 360° F. for hot-mixed asphalt paving applications because of the high viscosity of the asphalt. Due to the fact that the polyhydric alcohol-water mixture will readily coat the rubber particles, the fluidity of the asphalt-rubber mixture is improved thereby allowing mixing temperatures, for example from about 250° F. to about 310° F. and desirably from about 260° F. to about 300° F. During the course of mixing, while the boiling point of water will have increased due to the existence of a polyhydric alcohol therein, much of the water will tend to evaporate but not until after the water has served the important purpose of dissolving or extending the polyhydric alcohol and allowing it to readily coat the rubber particles. This reduction in temperature from most heretofore prior mixing procedures results in reduced energy requirements.

During the mixing process, an optional but often a very desirable feature is to add aggregate to the asphalt to produce a mixture suitable for the construction of asphalt pavements. Such aggregates generally include, but are not limited to, sand, crushed rock, naturally occurring gravel and other inorganic materials which conform to standard specifications for paving as required by various governmental agencies such as the Department of Transportations. Typically the paving mixtures contain 90 to 96% aggregate, the remainder being the asphalt-rubber blend.

The invention will be better understood by reference to FIG. 1, which serves to illustrate, but not to limit the present invention. Referring to FIG. 1, tank 10 or other suitable container contains a rubber latex having a low amount of a polyhydric alcohol therein. The rubber latex-polyhydric alcohol solution is fed via conduit 15 such as a pipe to heated mixer 50 that can be a rotating heated drum. Asphalt tank 20 that houses one or more different types of heated asphalts is connected to heated mixer 50 via conduit 25 such as a pipe. The asphalt and the rubber latex-polyhydric alcohol solutions can be blended immediately prior to entering the mixer 50, as shown in FIG. 1, or within mixer 50. Aggregate 30 such as a blend of sand, crushed rock or gravel can be fed by suitable means such as conveyor belt 35 into mixer 50 wherein during mixing, the polyhydric alcohol-water solution maintains the coating around the rubber particles and the rubber particles as well as the aggregates are randomly mixed into the asphalt. The asphalt-rubber blend, due to the polyhydric alcohol coating of the rubber particles is more fluid and thus less heat is required to mix all of the various components. As noted above, suitable mixing temperatures generally range from about 250° F. to about 310° F. and desirably from about 260° F. to about 300° F.

Upon completion of mixing, the aggregate coated with the asphalt-rubber blend is discharged from the drum. This paving mixture can be conveyed by conveyor 55 into silo 60 for future use or dumped directly into a truck for transport to a paving location. The paving mixture is typically applied with conventional paving machines and compacted with heavy steel wheeled rollers. Typical industry standards for asphalt paving practices generally apply except that the mixture may be applied and compacted at lower than conventional temperatures The following Examples, wherein "parts" refer to "parts by weight", serve to illustrate but to limit the present invention.

EXAMPLE 1

An elastomeric polymer of butadiene and styrene (ratio of 75:25) in aqueous latex form of 100 parts rubber solids and 41.8 parts water was added to a mixing tank. In another mixing tank glycerol and water were blended together to form a solution of 8.7 parts glycerol and 4.8 parts water. The glycerol-water solution was added to the aqueous latex mixing tank under mild agitation to form a final dispersion of 100 parts rubber solids, 8.7 parts glycerol and 46.6 parts water. Additional compounding agents such as crosslinking agents can be added to the dispersion to enhance the properties of the rubber when added to the asphalt. In this Example, 0.2 parts of a sulfur dispersion containing 68% sulfur and 32% water was added to the latex compound. The resulting product was blended with hot (250° F. to 350° F.) petroleum-residue asphalt having a penetration of 85-100 (penetration method: ASTM D-5) at an amount of 3 parts rubber solids to 100 parts asphalt by injection into the asphalt line just prior to the asphalt entering the drum mixer of a contractor's hot-mix plant. For additional mixing, a blending device in the asphalt line such as a static in-line blender or any other mechanical means suitable can optionally be utilized. While much of the water flashes off in the drum mixer, the remaining microscopic rubber solids are still coated with the remaining water and glycerol. As the mixing continues with the aggregate, the glycerol retards the penetration of the asphalt into the polymer particles.

The end result is an asphalt that has improved physical properties under all weather conditions. The rubber particles add toughness and tenacity to the asphalt and improve the asphalt's ability to function as an effective adhesive to retain the aggregate of the paving mixture. At high temperatures the asphalt is better able to resist shoving and distortion due to traffic loadings and at low temperatures the asphalt is less brittle. High and low temperature properties are enhanced as evidenced by increased temperature range as measured by the SHRP asphalt testing protocol. The retarding of the solvating action of the asphalt upon the rubber particle imparted by the polyhydric alcohol coating makes proper compaction of the asphalt paving mixture easier to achieve. Proper compaction of an asphalt pavement is essential to its longevity as it improves its stability to traffic and resistance to damage caused by freeze thaw cycles.

Another embodiment of the present invention relates to the utilization of one or more polyhydric alcohols, but no rubber, with one or more fillers, either organic or inorganic in nature such as, but not limited to, various types of carbon black, various types of clay such as kaolin clay, various metal oxides such as calcium oxide, or various carbonates such as calcium carbonate. These fillers are added along with one or more polyhydric alcohols and mechanically mixed with an asphalt, having penetrating values set forth herein above, and optionally but desirably aggregate in order to lower asphalt mixing temperatures. In this embodiment, rubbers are generally not utilized, and if utilized, the amount thereof is very low, that is about 2 parts by weight or less, desirably about 1 part by weight or less, and preferably about 0.5 parts by weight or less per 100 parts by weight of the one or more asphalts. Preferably no rubber whatsoever is utilized. The amount of the one or more fillers utilized is from about zero or 1 to about 5,000 parts by weight, desirably from about 100 to 2,000 parts by weight, and preferably from about 500 to about 1,000 parts by weight based upon 100 total parts by weight of the one or more polyhydric alcohols. The polyhydric alcohol substantially or completely (i.e. 100%) coats the one or more fillers. That is, based upon the total surface area of all of the fillers, generally at least about 80% is coated, desirably at least about 90% is coated, and preferably at least about 95% or at least about 98% is coated by the polyhydric alcohol. The use of water is optional but if utilized, the amount thereof is from 1 to about 2,000 parts by weight, desirably from about 50 to about 1,200 parts by weight, and preferably from about 100 to about 600 parts by weight per 100 parts by weight of the one or more polyhydric alcohols. Naturally, when water is utilized, a dispersion exists comprising water, polyhydric alcohol, and a filler. Any suitable stabilizer known to the art and to the literature can be utilized to maintain the suspension of the filler. Subsequently, the dispersion containing the polyhydric alcohol and filler can be added and mixed with one or more asphalts in an amount of about 0.1 to about 5 parts by weight of the polyhydric alcohol, desirably from about 0.3 to about 3 parts by weight and preferably from about 0.4 to about 1.5 parts by weight of the polyhydric alcohol per 100 parts by weight of the asphalt, in any conventional manner such as by addition to an agitated tank or the pug mill or drum mixer of a typical hot-mix asphalt plant. Preparation of such a mixture is set forth in Example 2.

EXAMPLE 2

A stable dispersion containing 12 parts by weight of crude glycerol, 100 parts by weight of calcium carbonate, 40 parts by weight of water, and an appropriate dispersing agent was made with vigorous agitation in a mixing tank. The resulting product was blended with hot (250° F. to 350° F.) petroleum-residue asphalt having a penetration of 85-100 (Penetration method: ASTM D-5) in an amount of 0.5 parts by weight of crude glycerol to 100 parts by weight of asphalt by injection into the asphalt line just prior to the asphalt entering the drum mixer of a contractor's hot-mix plant. For additional mixing, a blending device in the asphalt line such as a static in-line blender or any other mechanical means suitable can be utilized. Much of the water was flashed off in the drum mixer leaving the microscopic calcium carbonate solids coated with the remaining water and crude glycerol. Concurrently or subsequently, the polyhydric alcohol coated filler can be mixed with aggregate. Any other means of introducing the said calcium carbonate dispersions into hot, liquid asphalt such as, but not limited to, mixing tanks or colloid mills may be utilized in lieu of a contractor's hot-mix plant. Care must be exercised to allow for the venting of water vapor release from any such operations. The utilization of an asphalt filler composition not containing rubber wherein the filler is coated with one or more polyhydric alcohols resulted in a reduced asphalt mixing temperature and that instead of typically being from about 300° F. to about 320° F. was within the range of from about 230° F. to about 280° F. and desirably from about 240° F. to about 260° F.

Another embodiment of the present invention relates to the utilization of the polyhydric alcohol, but substantially or totally free of rubber, with or without water added and mechanically mixed with an asphalt having penetrating values set forth hereinabove, and optionally but desirably aggregate in order to lower asphalt paving mixing and application temperatures. Rubber is not utilized in this embodiment or, alternative, very small amounts thereof such as about 1 part by weight or less, desirably about 0.5 parts by weight or less, and preferably about 0.1 parts by weight or less per 100 parts by weight of asphalt. One or more of the various above-noted polyhydric alcohols can be utilized either alone or optionally with water so that when mixed with the asphalt it will form microscopic globules which act as slip planes making the asphalt more fluid. The use of water is optional, and when utilized, the amount thereof is from 1 to about 500 parts by weight, desirable from 10 to about 200 parts by weight, and preferably from about 25 to about 75 parts by weight per 100 parts by weight of the one or more polyhydric alcohols. Generally the amount of polyhydric alcohol utilized is low since it tends to act as a plasticizer with respect to the asphalt. Thus, the amount of polyhydric alcohol is from about 0.1 to about 5 parts by weight, desirably from about 1 to about 4 parts by weight, and desirably from about 2 to about 3 parts by weight per 100 parts by weight of the one or more asphalts utilized. Preparation of such a mixture is set forth in Example 3.

EXAMPLE 3

A solution of 100 parts crude glycerol and 50 parts water was mixed with gentle agitation in a mixing tank. The solution was blended with hot (250° F. to 350° F.) petroleum-residue asphalt having a penetration of 85-100 (Penetration method: ASTM D-5) in an amount of 2 parts crude glycerol to 100 parts asphalt by injection into the asphalt line just prior to the asphalt entering the drum mixer of a contractor's hot-mix plant. For additional mixing a blending device in the asphalt line such as a static in-line blender or any other mechanical means suitable may be utilized, but is not absolutely necessary. The glycerol water solution was dispersed throughout the asphalt and resulted in making the asphalt paving mixture or the asphalt-aggregate paving mixture more fluid and easer to mix and apply at lower temperatures. Any other means of introducing the said crude glycerol solution into hot, liquid asphalt such as, but not limited to, mixing tanks or colloid mills may be utilized in lieu of a contractor's hot-mix plant. Care must be exercised to allow for the venting of water vapor release from any such operations. The net result of utilizing an asphalt-polyhydric alcohol composition free of rubber was the ability to mix the hot asphalt at a temperature of from about 230° F. to about 280° F. and preferably at a temperature of from about 240° F. to about 260° F., as compared to generally a mixing temperature range of from about 300° F. to about 320° F. when no polyhydric alcohol was utilized.

The asphalt-rubber particle-aggregate blends, the asphalt-filler composition blends, and the asphalt-polyhydric alcohol blends, of the present invention are utilized wherever "asphalt-type" compositions are utilized such as for paving roads, parking areas, parking decks, airfield aprons, taxiways, runways, industrial flooring, landfill linings, and waterproofing applications.

While in accordance with the patent statutes the best mode and preferred embodiment have been set forth, the scope of the invention is not intended to be limited thereto, but only by the scope of the attached claims.

What is claimed is:

1. A rubberized asphalt composition, comprising:
    from about 2 to about 18 parts by weight of one or more polyhydric alcohols per 100 parts by weight of one or more rubbers wherein said one or more polyhydric alcohols substantially coat said rubber particles, said one or more rubbers having a Mooney value ML/4/212° F. of from about 50 to about 300; and
    from about 1 to about 15 parts by weight of said one or more rubber particles per 100 parts by weight of one or more asphalts.

2. The rubberized asphalt composition of claim 1, wherein said one or more asphalts have a penetration value according to ASTM D-5 at 77° F. of from about 30 to about 300; and wherein said polyhydric alcohol comprises glycerol, crude glycerol, a glycol having from 2 to about 4 carbon atoms, a polyglycol having from 2 to 12 carbon atoms in the repeat unit and a number average molecular weight of from about 100 to about 20,000, or a sugar, or any combination thereof.

3. The rubberized asphalt composition of claim 2, wherein the amount of said one or more polyhydric alcohols is from about 3 to about 12 parts by weight per 100 parts by weight of said rubber;
    wherein the amount of said one or more rubber particles is from about 1 to about 10 parts by weight per 100 parts by weight of said asphalt; and
    wherein based upon the total surface area of all rubber particles at least about 80% is coated by said polyhydric alcohol.

4. The rubberized asphalt composition of claim 3, wherein said polyhydric alcohol is glycerol, or ethylene glycol, or a combination thereof;
    wherein said rubber particles are a copolymer of styrene-butadiene; and
    wherein said asphalt penetration value is from about 50 to about 150.

5. A filler-asphalt composition, comprising:
    one or more polyhydric alcohols; from about 1 to about 5,000 parts by weight of one or more organic or inorganic fillers per 100 parts by weight of said one or more polyhydric alcohols, and zero or from about 1 to about 2,000 parts by weight of water per 100 parts by weight of said one or more polyhydric alcohols; and the amount of polyhydric alcohol being from about 0.1 to about 5 parts by weight per 100 parts by weight of one or more asphalts wherein said asphalt has an ASTM D-5 penetration value at 77° F. of from about 30 to about 300.

6. The filler-asphalt composition of claim 5, wherein said filler is a carbon black, a clay, a metal oxide, or a metal carbonate;

wherein said polyhydric alcohol comprises glycerol, crude glycerol, a glycol having from 2 to about 4 carbon atoms, a polyglycol having from 2 to 12 carbon atoms in the repeat unit and a number average molecular weight of from about 100 to about 20,000, or a sugar, or any combination thereof;

wherein the amount of said filler is from about 100 to about 2,000 parts by weight per 100 parts by weight of said polyhydric alcohol, wherein the amount of said water is zero or from about 50 to about 1,200 parts by weight per 100 parts by weight of polyhydric alcohol; and wherein said filler-asphalt composition is substantially free of rubber.

7. The filler-asphalt composition of claim 6, wherein based upon the total surface area of all fillers at least about 80% is coated by said polyhydric alcohol; and wherein said filler is a carbon black, a clay, calcium oxide, or calcium carbonate, or any combination thereof.

8. The filer-asphalt composition of claim 7, wherein said asphalt has a penetration value of from about 50 to about 150; wherein said filler is calcium carbonate, wherein said polyhydric alcohol is glycerol, wherein the amount of said polyhydric alcohol is from about 0.3 to about 3 parts by weight per 100 parts by weight of said asphalt.

9. A polyhydric-asphalt composition, consisting essentially of:

from about 0.1 to about 5 parts by weight of one or more polyhydric alcohols per 100 parts by weight of one or more asphalts, and zero or from about 1 to about 500 parts by weight of water per 100 parts by weight of said one or more polyhydric alcohols; and wherein said asphalt has an ASTM D-5 penetration value at 77° F. of from about 30 to about 300.

10. The polyhydric-asphalt composition of claim 9, wherein said polyhydric alcohol comprises glycerol, crude glycerol, a glycol having from 2 to about 4 carbon atoms, a polyglycol having from 2 to 12 carbon atoms in the repeat unit and a number average molecular weight of from about 100 to about 20,000, or a sugar, or any combination thereof;

wherein the amount of said polyhydric alcohol is from about 1 to about 4 parts by weight per 100 parts by weight of said asphalt, wherein the amount of said water is zero or from about 10 to about 200 parts by weight per 100 parts by weight of said polyhydric alcohol; and wherein said polyhydric-asphalt composition is substantially free of rubber.

11. The polyhydric-asphalt composition of claim 10, wherein said asphalt has a penetration value of from about 50 to about 150; wherein said polyhydric alcohol is glycerol; wherein the amount of said polyhydric alcohol is from about 2 to about 3 parts by weight per 100 parts by weight of said asphalt; and wherein the amount of said water is zero or from about 25 to about 75 parts by weight per 100 parts by weight of said asphalt.

* * * * *

UNITED STATES PATENT AND TRADEMARK OFFICE
CERTIFICATE OF CORRECTION

| | | |
|---|---|---|
| PATENT NO. | : 7,935,749 B2 | Page 1 of 1 |
| APPLICATION NO. | : 12/148244 | |
| DATED | : May 3, 2011 | |
| INVENTOR(S) | : David A. Carlson | |

It is certified that error appears in the above-identified patent and that said Letters Patent is hereby corrected as shown below:

Column 9 (Claim 8), line 28, "filer-asphalt" should be -- filler-asphalt --

Signed and Sealed this
Twenty-eighth Day of June, 2011

David J. Kappos
*Director of the United States Patent and Trademark Office*